April 23, 1963  P. B. FONDÉN ET AL  3,086,734
DEVICE FOR PREVENTING THE RUNAWAY OF AIRPLANES IN LANDING
Filed Jan. 21, 1960
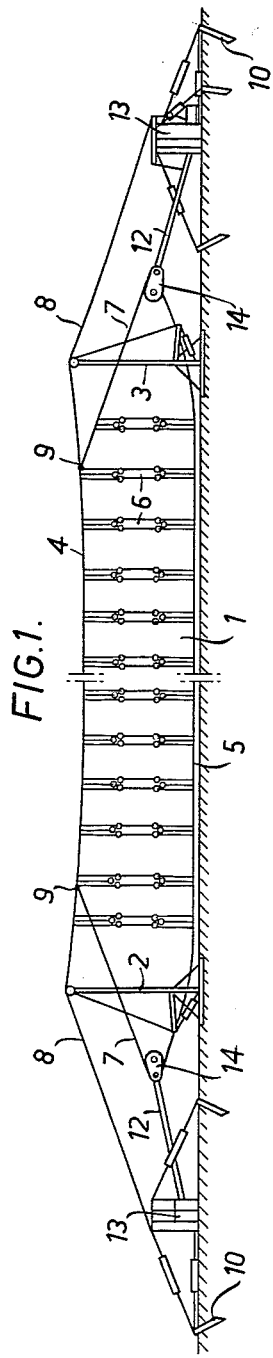
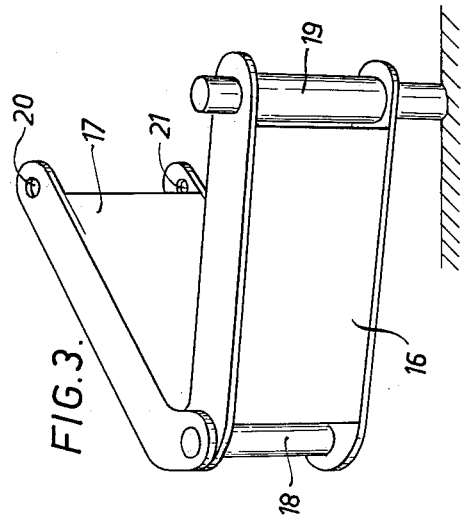
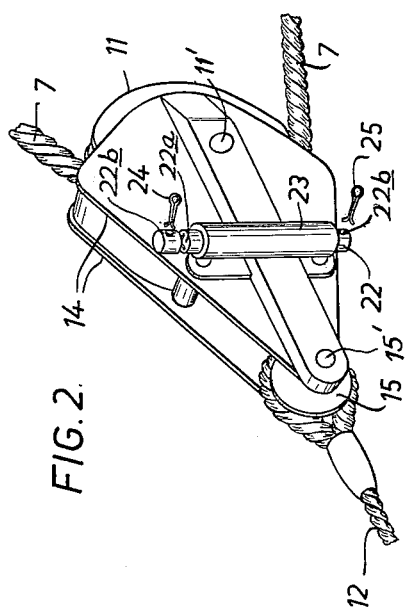
Inventors
Per B. Fondén,
Karl O.J. Wålander
by Sommers + Young
Attorneys

United States Patent Office 3,086,734
Patented Apr. 23, 1963

3,086,734
DEVICE FOR PREVENTING THE RUNAWAY OF AIRPLANES IN LANDING
Per Börje Fondén, Gotgatan 23, and Karl Ove Torgny Wålander, Vasavagen 49, both of Linkoping, Sweden
Filed Jan. 21, 1960, Ser. No. 3,936
2 Claims. (Cl. 244—110)

The present invention relates to devices for preventing the runaway of airplanes in landing and more particularly to that type of such devices which comprises an arresting net suspended in a substantially vertical plane between two preferably tiltable masts. A well-known type of such a net includes a pair of supporting wires extending in substantially horizontal directions spaced from each other in a vertical plane and interconnected by means of a set of vertical ropes of a material of a high degree of extensibility. At both ends the net is connected to braking mechanisms.

In operation, the net is adapted to arrest and stabilize the airplane by means of its vertical elements which are adapted primarily to retain the wings of the airplane. To this end the said elements should be capable of being stretched about the wings. This condition in its turn has involved the requirement in case of known structures that the ropes or straps forming the vertical elements of the net should take up such positions as to cause the forces taken up by the net to be distributed between the horizontal upper and lower supporting wires in such a manner as to ensure a force equilibrium. Due to this fact certain modern airplanes having wings with sharp leading edges or leading edges having sharp portions, could not be arrested by the known types of nets, since the vertical elements of the nets were cut off while sliding along the leading edges of the wings.

It is an object of the invention to avoid this drawback. To this end the upper and lower supporting wires of the net form an endless loop which at both horizontal edges of the net is passed over pulleys connected by cables to braking mechanisms.

By this means the said horizontal ends of the net will not stationarily be held but will be connected to the braking mechanisms in such a manner as to balance the tensioning forces exerted on the net without causing any tendency towards sliding movement of the vertical elements of the net with relation to the wings in engagement therewith.

With this and other objects in view the invention will be hereinafter more fully described, reference being had to the accompanying drawing illustrating a preferred embodiment of the invention.

In the drawing, FIG. 1 is an elevation of a net according to the invention shown in its raised or operative position. FIG. 2 is an enlarged perspective view of a pulley with means for connecting it to a braking mechanism, some of elements being in slightly displaced or exploded condition for the purpose of clearer illustration and FIG. 3 is an enlarged perspective view of a supporting bracket for the structure shown in FIG. 2.

With reference to FIG. 1 of the drawing, the numeral 1 designates the net as a whole and 2 and 3 are the supporting masts therefor.

The net which is located in a vertical plane between the masts comprises two substantially horizontal supporting wires, viz. an upper wire 4 and a lower wire 5 and a set of substantially vertical interconnection ropes 6 therebetween. The supporting wires are connected at their ends to each other by wires or ropes 7 so as to form a continuous loop or an endless frame for the net.

The masts are mounted to tilt around horizontal pivots, not shown. Normally, in their upright state, the masts are stayed by wires 8 connected by their one end to inner points 9 of the upper supporting wire 4 of the net and anchored by their other end to the ground, as indicated at 10. The connecting wires 7 of the upper and lower net supporting wires 4 and 5 are passed around pulleys 11 mounted between plates 14 which are connected, as by means of cables 12, to braking mechanisms indicated at 13. Said braking mechanisms may be of the drum-and-shoe type with each cable 12 connected to or constituting the extreme end portion of a brake cable wound about the drum of the respective braking mechanism.

The vertical members 6 of the net include middle portions provided with a suitable covering for protection against severing forces and end portions of a highly extensible material. The protected middle portions are located within the range liable to be engaged by the leading edges of an airplane to be arrested. Upon an airplane running into the net the middle portions of the members 6 will fold about the leading edges of the wings on a level which cannot be exactly predetermined. Thus, either the upper supporting wire 4 or the lower supporting wire 5 may be first subjected to tensioning. In hitherto known nets having fixed ends the vertical members 6 would slide along the leading ends of the wings in contact therewith, until both supporting wires are equally tensioned, thus re-establishing the balance of forces acting on both supporting wires.

In the structure shown the supporting wire first tensioned upon the collision of an airplane with the net will become lengthened while the other supporting ring will become shortened correspondingly because of the passing of the end connections of the net over the pulleys 11.

In FIG. 2 is shown the arrangement of a pulley 11 and its supporting side wall members 14, it being noted that both pulley structures are identical. The pulley 11 proper is rotatably mounted between two side walls 14 on axle 11' and the connecting wire or rope 7 is passed around the portion of the pulley enclosed between said side walls. Between said side walls 14 at the end thereof remote from the pulley 11 is mounted on axle 15' a small disc 15 around which disc one end of the cable 12 is fastened. The other end of said cable is connected to the respective braking mechanism 13, FIG. 1. In order to prevent rotation of the structure comprised of walls 14 with the pulley 11 around the axis of cable 12, whereby a twisting of the wires 7 would result during the initial stage of the arresting operation, the wall structure is mounted so as to be capable of swinging freely around a vertical axis while being prevented from any other movement. To this end there is provided the bearing structure shown in FIG. 3. Said structure comprises two preferably rectangular plates 16 and 17 hingedly connected together at 18. One of the plates, in the drawing the one designated by 16, is mounted to swing at its edge remote from the hinge 18 on a vertical pivot 19 rigidly anchored in the ground. The axis of the pivot 19 and the hinge 18 are parallel, that is to say, the hinge 18 is also vertical. Provided at the end of the plate member 17 remote from hinge 18 are an upper and a lower horizontally projecting flange, said flanges having holes 20 and 21, respectively, for receiving a pivot pin 22 carried by one of the side walls 14 of the pulley carrier where it is rotatably accommodated in a vertical sleeve 23 secured to said side wall. The pin 22 projects beyond the ends of sleeve 23 and is adapted to engage the holes 20 and 21 by said projecting ends. Having been brought into engagement with said holes the pin 22 is locked against axial displacement by means of split cotter pins 24 and 25, respectively. By this mounting of the pulley carrying structure it is allowed to move horizontally over a rather large range while locking the structure against all other movements while in state of ready for a plane-arresting operation.

In FIGURE 2 of the drawing pin 22 is represented as slightly displaced axially upwardly in order to expose the circular groove 22a near its upper end, which together with a similar groove near its bottom end serve to weaken pin 22 at these locations and act as incipient fracture points. The end portions 22b of the pins 22 extend with holes 20 of the above mentioned flanges of plates 16 and 17, and are held in place by cotter pins 24 and 25 which extend through holes in the end portions 22b of pins 22.

The purpose of the supporting bracket of FIG. 3 and its connection with the pulley mechanism of FIG. 2 is to prevent twisting of the ropes 7 while slack while still allowing a certain amount of horizontal movement through the hinge action of plates 16, 17 about pin 18.

When the arresting net is engaged by a plane to be arrested the slack is taken up in ropes 7, so that there is no longer any danger of their becoming intertwisted. The supporting hinge bracket of FIG. 3 has now completed its purpose and become disconnected from the pulley structure of FIG. 2, by fracture of pin 22 at the grooves 22a. This fracture prevents the supporting bracket from being dislodged from its moorings in the ground.

We claim:

1. In a device for preventing the runaway of airplanes in landing in combination, an arresting net including a pair of substantially horizontal supporting wires spaced from each other in a vertical plane and a set of interconnection ropes extending vertically between said supporting wires, two horizontally spaced masts, means connected with said masts as well as with the upper supporting wire for staying the masts in vertical position and holding the net suspended therebetween, wires connected to the ends of the upper and lower supporting wires of the net so as to form in combination with said supporting wires a continuous loop, pulleys each engaged by a separate one of said connecting wires, a pair of stationary provided braking mechanisms, and connections between said pulleys and said braking mechanisms.

2. In a device as claimed in claim 1 the further feature that the pulleys are mounted on carriers having vertically disposed mounting means to maintain the pulleys in vertical planes with their axes situated horizontally at right angles to the longitudinal direction of the net, supporting means for each of said carriers having vertical pivotal connections with the respective carrier to allow said carriers to swing horizontally only.

References Cited in the file of this patent

UNITED STATES PATENTS

| | | |
|---|---|---|
| 356,639 | Helfenstein | Jan. 25, 1887 |
| 2,465,936 | Schultz | Mar. 29, 1949 |
| 2,854,201 | Cotton | Sept. 30, 1958 |
| 2,913,197 | Fonden et al. | Nov. 17, 1959 |
| 2,919,872 | Nord | Jan. 5, 1960 |

FOREIGN PATENTS

| | | |
|---|---|---|
| 744,433 | Germany | Jan. 15, 1944 |
| 1,057,883 | Germany | May 21, 1959 |